(12) United States Patent
Okabe

(10) Patent No.: US 7,855,844 B2
(45) Date of Patent: Dec. 21, 2010

(54) OBJECTIVE LENS AND OPTICAL MEASURING DEVICE

(75) Inventor: Kenji Okabe, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 249 days.

(21) Appl. No.: 12/153,135

(22) Filed: May 14, 2008

(65) Prior Publication Data

US 2008/0285158 A1  Nov. 20, 2008

(30) Foreign Application Priority Data

May 17, 2007  (JP) ............................... 2007-131771

(51) Int. Cl.
*G02B 9/00* (2006.01)
(52) U.S. Cl. .................. 359/739; 359/740; 359/819
(58) Field of Classification Search .................. 359/739, 359/738, 740, 819
See application file for complete search history.

(56) References Cited

U.S. PATENT DOCUMENTS

| | | | |
|---|---|---|---|
| 5,020,892 A | | 6/1991 | Glover et al. |
| 5,864,721 A | * | 1/1999 | Suda et al. .................. 396/114 |
| 6,072,600 A | * | 6/2000 | Wertsberger ................ 358/479 |
| 6,130,750 A | | 10/2000 | Ausschnitt et al. |
| 6,222,801 B1 | | 4/2001 | Yoo et al. |
| 6,317,211 B1 | | 11/2001 | Ausschnitt et al. |
| 7,088,395 B2 | * | 8/2006 | Takayama et al. ............ 348/297 |
| 7,334,950 B2 | * | 2/2008 | Viglione et al. ............. 396/452 |
| 7,476,873 B2 | * | 1/2009 | Hayashi .................... 250/458.1 |
| 7,612,350 B2 | * | 11/2009 | Takamizawa ............ 250/461.2 |
| 7,688,359 B2 | * | 3/2010 | Zhao et al. ................ 348/229.1 |
| 2006/0262702 A1 | | 11/2006 | Ide et al. |

FOREIGN PATENT DOCUMENTS

| | | |
|---|---|---|
| JP | A-6-214166 | 8/1994 |
| JP | A-8-122651 | 5/1996 |
| JP | A-8-145872 | 6/1996 |
| JP | A-10-206741 | 8/1998 |
| JP | A-2006-243723 | 9/2006 |

OTHER PUBLICATIONS

Aug. 9, 2010 Office Action issued in Chinese Patent Application No. 200810097144.8 (with translation).

* cited by examiner

*Primary Examiner*—Timothy J Thompson
(74) *Attorney, Agent, or Firm*—Oliff & Berridge, PLC

(57) ABSTRACT

An objective lens used for a microscope includes a lens(es), an iris diaphragm and a tubular body. The lens(es), which is provided in a manner facing an object, transmits light reflected from a measuring surface of the object. The iris diaphragm, which is provided behind the lens(es), changes an aperture diameter of a light-transmissive aperture of a light-transmissive surface that is substantially orthogonal to a main optical axis of the light transmitted through the lens(es). The tubular body, which is detachably mounted on a revolving nosepiece of a trunk that includes a zoom imaging lens(es) for forming an image from the light transmitted through the light-transmissive aperture, holds the lens(es) and the iris diaphragm.

6 Claims, 3 Drawing Sheets

OBJECTIVE LENS AND OPTICAL MEASURING DEVICE

BACKGROUND OF THE INVENTION

1. Field of the Invention

The present invention relates to an objective lens detachably mounted on an image-forming portion for forming an image from light received by the objective lens, and to an optical measuring device including the objective lens.

2. Description of Related Art

An infinity-correction optical system for forming an image by using an objective lens and an image-forming lens (tube lens) has been conventionally so flexible in terms of layout of optical systems as to allow an illumination optical system to be included therein because light between the objective lens and the tube lens is parallel. Thus, such an infinity-correction optical system has been applied to various optical machines, a representative example of which a metallographic microscope excellent in resolution and flatness.

In microscope objective lens(es) for forming such an infinity-correction optical system, numerical aperture (hereinafter abbreviated as NA), as well as wavelength to be used, is an important parameter for determining resolution and focal depth.

Many manufacturers of optical machines provide an objective lens having standard resolution and standard focal depth, an objective lens having high resolution, small focal depth and high NA, and an objective lens having reduced NA and relatively large focal depth for one magnification so as to meet observation-related demands from users.

According to a known arrangement, without providing plural objective lenses that are mutually different in NA, NA is changeable (see, for instance, Document 1: JP-A-10-206741).

According to Document 1, a position of a rear focal point of an objective lens is moved by a relay lens toward an eyepiece so as to form an optical conjugate point, and a diaphragm is disposed at the conjugate point. The diaphragm is adapted to change NA of the objective lens.

However, in the above-described arrangement where plural objective lenses are provided, the objective lenses need to be replaced in accordance with types of objects, which may cause operation efficiency to be lowered.

In addition, when, for instance, an object to be observed cannot be observed because of a profile, a size or the like of the object, the arrangement according to Document 1 cannot conveniently change NA of the objective lens unless the objective lens is replaced.

SUMMARY OF THE INVENTION

In view of the above problems, an object of the present invention is to provide an objective lens and an optical measuring device capable of enhancing operation efficiency, with which an operator can observe an object in a manner that is suitable for the object.

An objective lens according to the aspect of the present invention includes: at least one lens provided in a manner facing an object, the at least one lens transmitting light reflected from a measurement surface of the object; a diaphragm provided behind the at least one lens, the diaphragm changing a light-transmissive range of a light-transmissive surface that is substantially orthogonal to a main optical axis of the light transmitted through the at least one lens, the light-transmissive range transmitting the light transmitted through the at least one lens; and a holder adapted to be mounted on a main body, the main body including an image-forming unit that forms an image from the light transmitted through the light-transmissive surface, the holder holding the at least one lens and the diaphragm.

According to the aspect of the present invention, the objective lens includes: the diaphragm provided behind the lens (i.e., a position opposite to the measurement surface of the object relative to the lens) and capable of changing the light-transmissive range of the light-transmissive surface; and the holder mounted on the main body including the image-forming portion, the holder holding the lens and the diaphragm.

Accordingly, by suitably changing the light-transmissive range of the diaphragm, NA of the objective lens is adjusted. Thus, there is no need to replace the objective lens so as to adjust NA, thereby enhancing operation efficiency.

In addition, there is no need to replace the NA-adjustable objective lens in accordance with profile, size or the like of the object. For instance, by detachably mounting the objective lens on a main body of a microscope, NA of the objective lens can be changed without using a special microscope in which a diaphragm is provided at a position opposite to the objective lens relative to the image-forming lens or without replacing the objective lens. Thus, observation suitable for the object can be properly conducted.

In the objective lens according to the aspect of the present invention, it is preferable that the diaphragm is provided at a position where an exit pupil of the at least one lens is formed.

According to the aspect of the present invention, the diaphragm is provided at the position where the exit pupil of the lens is formed. In other words, the diaphragm is provided at a position where the so-called exit pupil is formed, i.e., at a position where a focal point of the lens formed closer to an image and opposite to the object relative to the lens.

Accordingly, since changes of the light-transmissive range of the light-transmissive surface by the diaphragm do not shield only a part of the light for forming the image, the image of the object can be favorably transmitted without deviation in the resolution and the focal depth.

In the objective lens according to the aspect of the present invention, it is preferable that the diaphragm consecutively changes the light-transmissive range of the light-transmissive surface.

According to the aspect of the present invention, since the diaphragm can consecutively change the light-transmissive range of the light-transmissive surface, NA of the objective lens can be consecutively changed. With this arrangement, NA can be set at a value that is more suitable for a profile, a size or the like of the object, thereby enabling an observation that is more suitable for the object.

In the objective lens according to the aspect of the present invention, it is preferable that the diaphragm is an iris diaphragm.

According to the aspect of the present invention, the diaphragm is the iris diaphragm that changes an effective diameter of the light-transmissive range of the light-transmissive surface. Since the effective diameter of the light-transmissive range of the light-transmissive surface, i.e., a diameter of the optical path, can be smoothly changed with this arrangement, the light-transmissive range can be easily and consecutively changed.

In the objective lens according to the aspect of the present invention, it is preferable that the diaphragm changes the light-transmissive range of the light-transmissive surface in a stepwise manner.

According to the aspect of the present invention, since the diaphragm can change the light-transmissive range of the light-transmissive surface in a stepwise manner, NA of the objective lens can be also changed in a stepwise manner. With this arrangement, NA can be easily set at a value that is more suitable for a profile, a size or the like of the object.

The objective lens according to the aspect of the present invention preferably further includes a diaphragm controller that controls the diaphragm to change the light-transmissive range.

According to the aspect of the present invention, the diaphragm is controlled by the diaphragm controller, so that the light-transmissive range of the light-transmissive surface is changed. With this arrangement, since the diaphragm controller can control the diaphragm in accordance with an input signal from an input-operation unit such as a controller or a keyboard, NA can be easily set at a suitable value, thereby enhancing operation efficiency.

An optical measuring device according to another aspect of the present invention includes: the above-described objective lens; and the main body including: the image-forming unit that forms an image from the light transmitted through the objective lens; an eyepiece from which the light is irradiated; and an optical path that guides the light from the objective lens to the eyepiece.

According to the aspect of the present invention, the optical measuring device guides the light from the above-described objective lens to the eyepiece through the optical path. With this arrangement, the optical measuring device can easily adjust NA to a suitable value by using the diaphragm of the objective lens. In addition, since NA can be adjusted without replacing the objective lens, operation efficiency in measuring operations is enhanced.

DETAILED DESCRIPTION OF PREFERRED EMBODIMENT(S)

An exemplary embodiment of the present invention will be described below with reference to the attached drawings.

Figure 1:
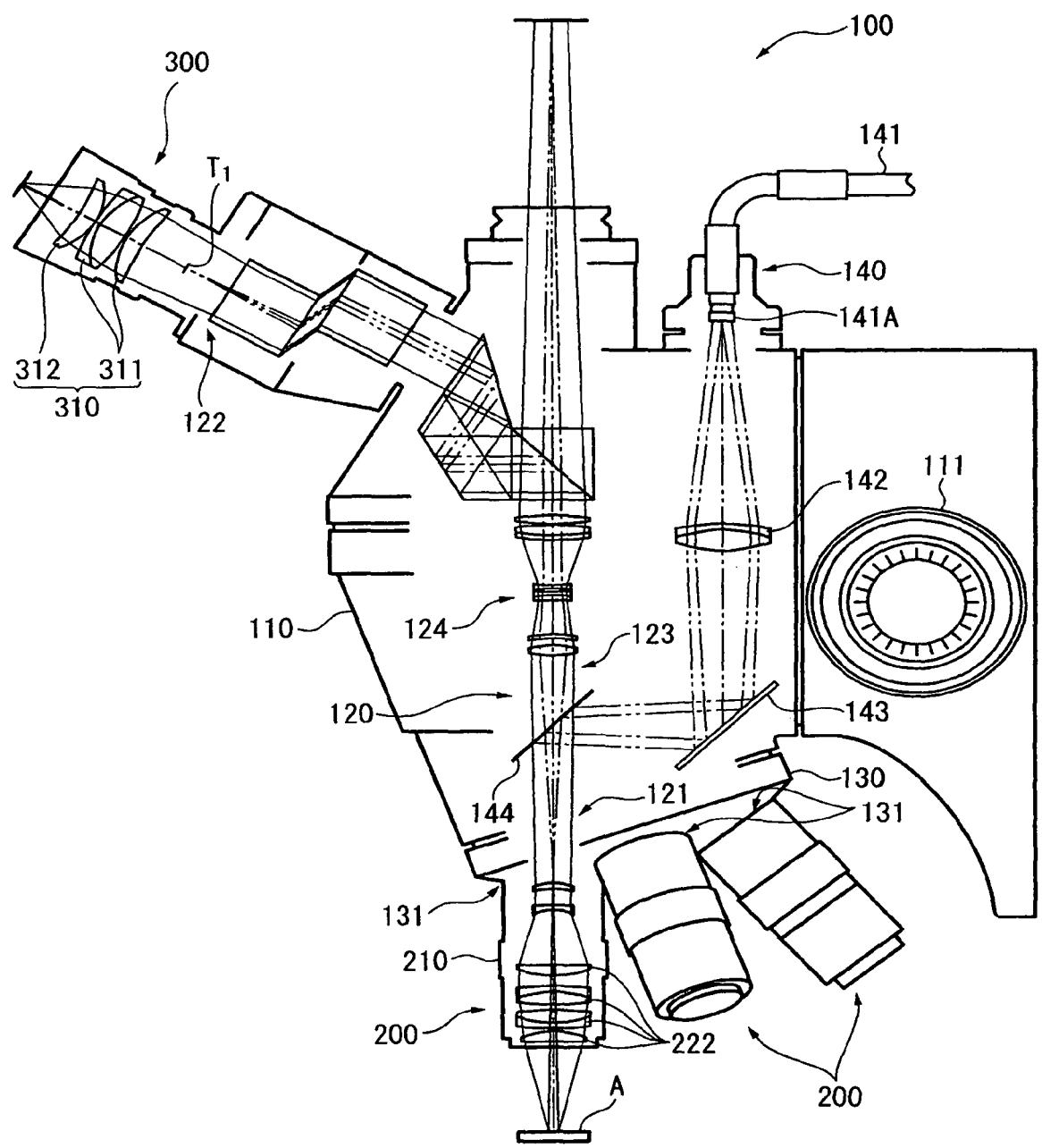
FIG. 1 schematically shows an arrangement of a primary optical portion of a microscope as an optical measuring device according to an exemplary embodiment of the present invention.
Figure 2:
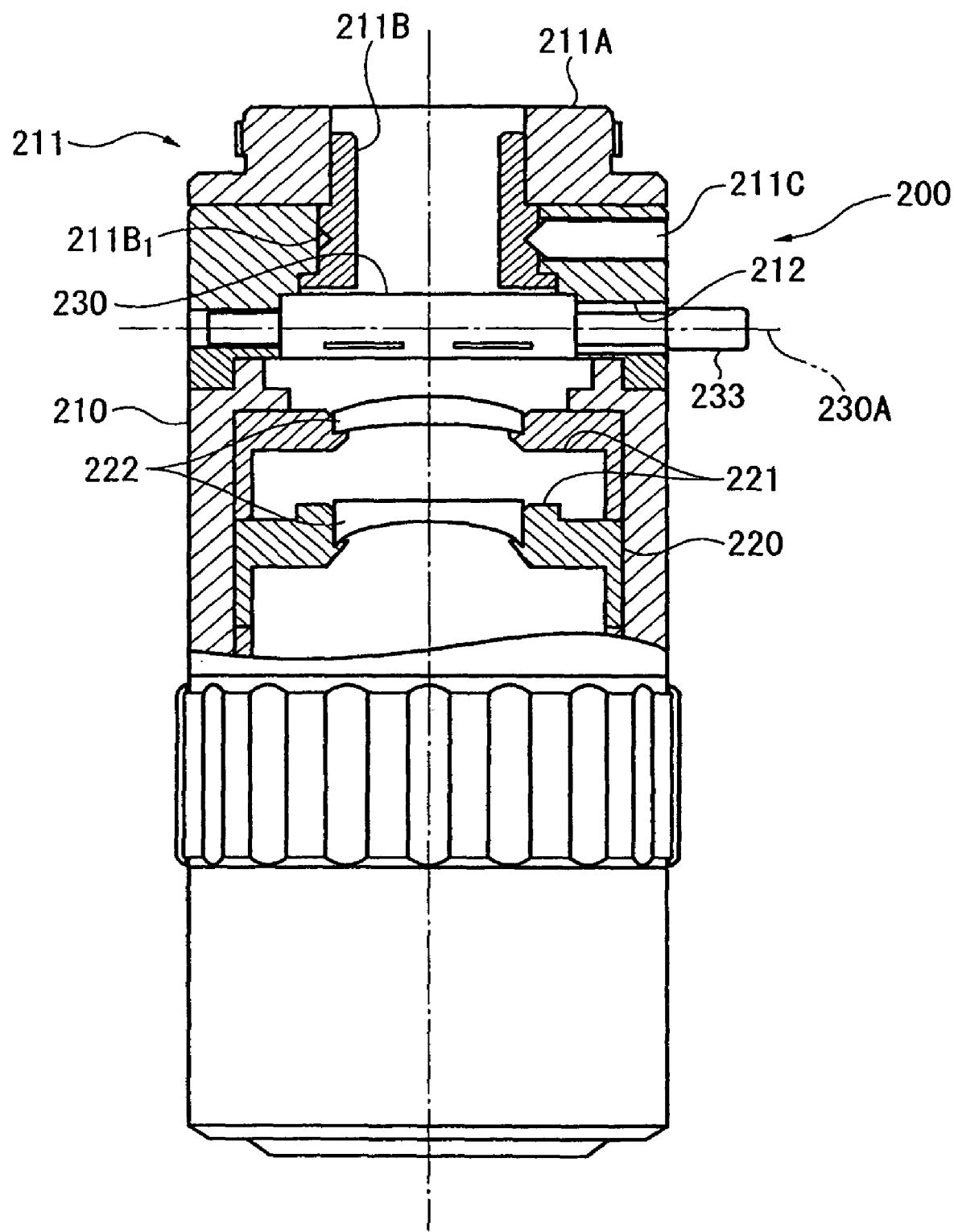
FIG. 2 is a side view showing a cross section of an objective lens according to the exemplary embodiment.
Figure 3:
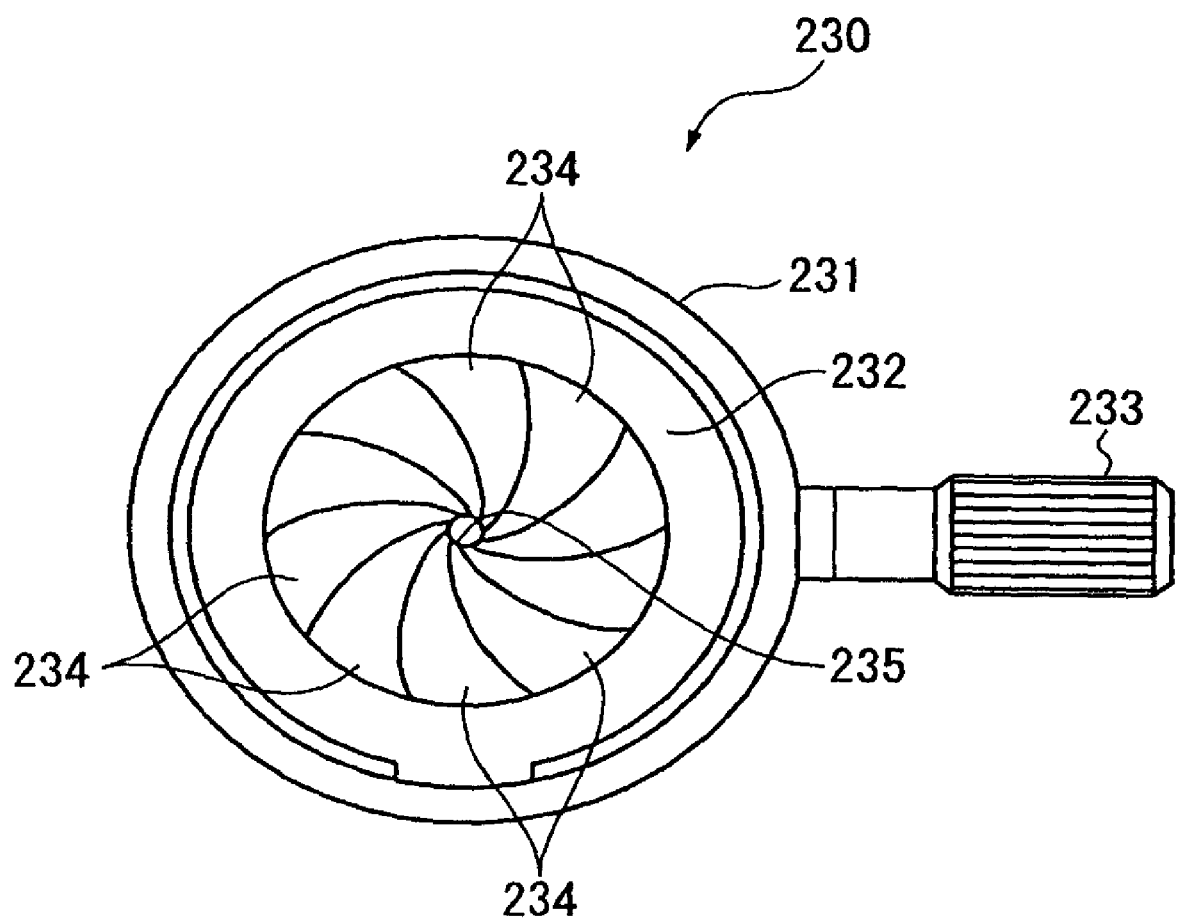
FIG. 3 is a top view showing an arrangement of an iris diaphragm used for the objective lens.

FIG. 1 schematically shows an arrangement of a primary optical portion of a microscope as an optical measuring device according to the exemplary embodiment of the present invention. FIG. 2 is a side view showing a cross section of an objective lens according to the exemplary embodiment. FIG. 3 is a top view showing an arrangement of an iris diaphragm used for the objective lens.

Arrangement of Microscope

In FIG. 1, a microscope serving as an optical measuring device, which is denoted by the numeral 100, includes a base (not shown), a stage (not shown) provided on the base, a trunk 110 connected to the base, an objective lens(es) 200 and an eyepiece 300. The trunk 110 is provided with an optical path 120 extending from the objective lens 200 to the eyepiece 300. In the microscope 100, light reflected from an object A and incident on the objective lens 200 is guided to the eyepiece 300 through the optical path 120, so that a user can observe an image of the object at a predetermined magnification through the eyepiece 300. The trunk 110 and the eyepiece 300 are included in a main body of the present invention.

The trunk 110 includes various operation handles such as a focusing handle 111 for adjusting vertical positions of the trunk 110 and an adjustment handle (not shown) for adjusting an aperture of an aperture diaphragm 141A provided to an illumination guide 140. While the present embodiment exemplifies an arrangement in which a distance between the trunk 110 and the stage is adjustable by adjusting the vertical positions of the trunk 110 using the focusing handle 111, the distance between the trunk 110 and the stage may be adjusted by vertically moving the stage.

As described above, the trunk 110 is provided with the optical path 120 communicating with the objective lens 200 and the eyepiece 300. Specifically, the optical path 120 includes: a first optical-path hole 121 adjacent to the objective lens 200 on which light from the objective lens 200 is incident; a second optical-path hole 122 adjacent to the eyepiece 300 from which light is irradiated into the eyepiece 300; and a light conductor 123 for guiding light from the first optical-path hole 121 to the second optical-path hole 122. The second optical-path hole 122 adjacent to the eyepiece is provided with a lens-engaging portion (not shown) with which the eyepiece 300 is detachably engaged. As shown in FIG. 1, the light conductor 123 includes plural optical components. The optical components reflect light, so that the light incident on the first optical-path hole 121 is guided to the second optical-path hole 122. The light conductor 123 further includes plural zoom imaging lenses 124. The zoom imaging lenses 124 form an image from the light incident on the first optical-path 121, and ejects the formed image to the second optical-path hole 122. Although the zoom imaging lenses 124 each, which are provided on the optical path 120, zoom the image formed from the light from the objective lens 200 at a predetermined magnification and transmit the zoomed image to the eyepiece 300 in the present embodiment, the arrangement is not limited thereto. For instance, the zoom imaging lenses 124 each may not necessarily zoom the image, but may merely form an image from the light from the objective lens 200.

The trunk 110 further includes a substantially disk-shaped revolving nosepiece 130 on which the objective lens(es) 200 is fixed. The revolving nosepiece 130 is provided at a position to face the stage. The revolving nosepiece 130 is mounted on the trunk 110 in a manner rotatable relative to the trunk 110. The revolving nosepiece 130 includes plural lens-fixing holes 131 for fixing the objective lenses 200. Each lens-fixing hole 131 is provided at such a position that, when the lens-fixing hole 131 is disposed by the rotation of the revolving nosepiece 130 on an extension of the first optical-path hole 121 of the optical path 120, the lens-fixing hole 131 and the first optical-path hole 121 are substantially axially aligned. The lens-fixing holes 131 can fix the plural objective lenses 200. The plural objective lenses 200, in each of which the lenses 200 are differently arranged, are different from one another in magnification.

The second optical-path hole 122 of the trunk 110 is detachably engaged with the eyepiece 300.

The eyepiece 300 engaged with the second optical-path hole 122 is exemplarily substantially tubular, and plural eyepiece-forming lenses 310 are disposed along the axis direction of the tubular shape. The eyepiece-forming lenses 310 include plural optical lenses such as plural field lenses 311 exemplarily used for converging incident light and an eye-facing lens 312 provided adjacent to a first end of the eyepiece 300. The eyepiece-forming lenses 310 magnify an image formed from the light converged by the zoom imaging lenses 124 at an intermediate image position T1, and converge the light from the zoom imaging lenses 124 such that an exit pupil of the eye-facing lens 312 is formed near the first end of the eyepiece 300 (i.e., near the end spaced apart from the second optical-path hole 122).

The trunk 110 further includes an illumination guide 140 for irradiating illumination light for illuminating the object A. The illumination guide 140 includes a light source (not shown) for irradiating the illumination light, optical fiber 141, a condenser lens 142, a reflecting mirror 143, a half mirror 144 and the like.

The optical fiber 141 guides the illumination light irradiated by the light source to a predetermined position within the trunk 110. An aperture diaphragm 141A for adjusting an amount of the illumination light is provided adjacent to a light-ejecting surface of the optical fiber 141.

The condenser lens 142 converges the illumination light irradiated from the fiber surface of the optical fiber 141. Specifically, while the illumination light irradiated from the optical fiber 141 is substantially radially diffused, the condenser lens 142 converges the radially-diffused illumination light so as to direct the converged light to the reflecting mirror 143 as substantially parallel light.

The reflecting mirror 143 reflects the illumination light from the condenser lens 142 to direct the illumination light to the optical path 120. While a single reflecting mirror 143 is exemplarily provided in the present embodiment, plural reflecting mirrors 143 may be provided for guiding the illumination light.

The half mirror 144 is provided within the optical path 120. The half mirror 144 reflects the light incident thereon from the reflecting mirror 143 to direct the light to the objective lens 200. In addition, the half mirror 144 directly transmits the light incident thereon from the objective lens 200 to guide the light from the objective lens 200 into the optical path 120.

With the above arrangement, the illumination guide 140 can form into parallel light the illumination light from the light source, and irradiate the parallel illumination light on the object A through the objective lens 200.

Arrangement of Objective Lens

Next, the objective lens(es) fixed on the revolving nosepiece 130 of the trunk 110 will be described.

As shown in FIG. 2, the objective lens 200 includes a tubular body 210 (holder), a lens holder 220 provided within the tubular body 210, an iris diaphragm 230 (diaphragm) and the like.

The tubular body 210 has such a tubular shape that, when the objective lens 200 is disposed on the extension of the first optical-path hole 121 of the optical path 120 by the rotation of the revolving nosepiece 130, the tubular shape and the optical path 120 are substantially axially aligned.

In addition, a first end of the tubular body 210 is provided with a fixed portion 211 that is fixed to one of the lens-fixing holes 131 of the revolving nosepiece 130. Specifically, the fixed portion 211 includes: a substantially cylindrical top member 211A that shares the same axis as the tubular body 210; a substantially cylindrical adjusting member 211B that abuts on both an inner circumference of the tubular body 210 and an inner circumference of the top member 211A; an adjusting screw 211C screwed into a hole communicating with a lateral of the tubular body 210 and the inner circumference of the tubular body 210, a tip end of the adjusting screw 211C being engaged with a lateral of the adjusting member 211B; and the like.

The adjusting member 211B is screwed to the top member 211A by a screw (not shown), so that the adjusting member 211B and the top member 211A are fixed together while fastening each other. In addition, the adjusting member 211B is slidably engaged with the tubular body 210 while being prevented from disengaging from the tubular body 210 by a step provided on a lower portion of the adjusting member 211B. A V-shaped groove 211B1 with which a tip end of the adjusting screw 211C is engaged is provided in a belt-like manner along an outer circumference of the adjusting member 211B. When the adjusting screw 211C is fastened to the V-shaped groove 211B1, the tubular body 210 is fixed so as not to be rotatable. On the other hand, when the adjusting screw 211C is not fastened to the V-shaped groove 211B1, the tubular body 210 is rotatable. When the objective lens 200 fixed to the revolving nosepiece 130 is disposed on the extension of the optical path 120, the tubular body 210 is rotated, so that the diaphragm-adjusting knob 233 is adjusted to moved to a predetermined position where a user can easily operate the diaphragm-adjusting knob 233. Then, the adjusting screw 211C is fastened to the V-shaped groove 211B1 to be fixed thereto.

The objective lens 200 is fixed to the revolving nosepiece 130 by screwing a male screw thread provided on a first end of the top member 211A (i.e., upper outer circumference of the top member 211A) into a female screw provided on the lens-fixing hole 131.

The lens holder 220, which is provided within the tubular body 210, has a tubular shape that shares the same axis as the tubular body 210. The lens holder 220 has plural lens holding portions 221 at predetermined positions. The lens holding portions 221 hold lenses 222, examples of which are concave lenses and convex lenses. In the present embodiment, the plural lenses 222 correct chromatic aberration and curvature of field.

The iris diaphragm 230 is provided adjacent to the first end of the tubular body 210, i.e., the end fixed to the lens-fixing hole 131. Specifically, the iris diaphragm 230 is disposed near a rear focal point of the lenses 222 (i.e., a focal point that is opposite to the stage relative to the lenses 222). In other words, the iris diaphragm 230 is disposed near an exit-pupil surface 230A (light-transmissive surface) on which the exit pupil is formed. When the exit-pupil surface 230A is formed outside of the tubular body 210 due to the magnification and the like of the lenses 222, the iris diaphragm 230 may be provided on the first end of the tubular body 210 on which the fixed portion 211 is provided.

As shown in FIG. 3, the iris diaphragm 230 includes a frame 231, a movable frame 232, a diaphragm-adjusting knob 233 and plural pupil vanes 234.

The frame 231, which is substantially annular, is fixed on the inner circumference of the tubular body 210.

The movable frame 232 is movable in a circumferential direction relative to the frame 231.

The diaphragm-adjusting knob 233, which protrudes from the frame 231 in a radial direction, also protrudes outwardly from the tubular body 210 through the knob hole 212 communicating with the inside and the outside of the tubular body 210. In addition, the diaphragm-adjusting knob 233 is linked with the movable frame 232 by a link (not shown). When the diaphragm-adjusting knob 233 is rotated, generated power is transmitted to the movable frame 232 via the link, so that the movable frame 232 is also rotated along the circumferential direction.

The iris vanes 234 each are a plate-like member that extends from the movable frame 232 toward the bore of the iris diaphragm, and rotatably provided on the movable frame 232. When the movable frame 232 is rotated by operating the diaphragm-adjusting knob 233, the iris vanes 234 are moved in the rotary direction such that their tip ends are reciprocated in the radial direction. With this arrangement, for instance, when the movable frame 232 is rotated counterclockwise in FIG. 3, the tip ends of the iris vanes 234 are moved outer-radially, such that a light-transmissive aperture 235 (light-transmissive region) defined by the tip ends of the iris vanes 234 is expanded. On the other hand, for instance, when the movable frame 232 is rotated clockwise, the tip ends of the iris vanes 234 are moved inner-radially, such that the light-transmissive aperture 235 is reduced.

According to such an arrangement of the objective lens 200, an aperture diameter of the light-transmissive aperture 235 can be consecutively changed by the iris diaphragm 230.

NA of the objective lens(es) 200 can be derived from the following formula (1).

$$(NA) = n \cdot \sin \theta \quad (1)$$

In the formula (1), θ represents an angle formed between a light beam passing the outermost portion of the objective lens 200 and the axis of the objective lens 200. In addition, n represents a refractive index of a medium between the objective lens 200 and the object A. When the medium is exemplarily air, n equals to one.

According to the formula (1), the expanded light-transmissive aperture 235 of the iris diaphragm 230 and the reduced light-transmissive aperture 235 of the iris diaphragm 230 are mutually different in the range for transmitting the light transmitted through the objective lens 200. Thus, NA of the objective lens 200 takes a different value, depending on whether the light-transmissive aperture 235 is expanded or reduced.

In addition, resolution R of the objective lens(es) 200 can be derived from the following formula (2) while focal depth D of the objective lens(es) 200 can be derived from the following formula (3).

$$R(\mu m) = \lambda / 2 \cdot NA \quad (2)$$

$$D(\mu m) = \lambda / 2 \cdot (NA)^2 \quad (3)$$

In the above formulae (2) and (3), λ represents wavelength of light. When the light is exemplarily visible light, λ is in a range of approximately 0.4 to 0.8 (μm).

As shown in the formulae (2) and (3), the resolution R and the focal depth D are varied in accordance with the value of NA.

Thus, by adjusting the iris diaphragm 230 so as to consecutively change (i.e., consecutively expand or reduce) the light-transmissive aperture 235, values of the resolution R and the focal depth D can be consecutively changed.

Operation(s) of Microscope

Next, operation(s) of the microscope 100 will be described.

In order to measure a sample mounted on the stage by operating the microscope 100, the revolving nosepiece 130 is initially rotated so as to dispose an objective lens 200 having a desired magnification on the extension of the optical path 120. Then, illumination light is irradiated from the illumination guide 140, and the irradiated illumination light is adjusted by the adjustment handle so that a desirable amount of the illumination light is irradiated onto the sample. In addition, by operating the focusing handle 111, for instance, the stage is moved to such a position that the sample can be favorably observed through the eyepiece 300.

The iris diaphragm 230 of the objective lens 200 is subsequently adjusted. Specifically, the diaphragm-adjusting knob 233 of the iris diaphragm 230 is operated, such that the light-transmissive aperture 235 at the exit-pupil surface 230A is expanded or reduced. At this time, since the size of the light-transmissive aperture 235 can be consecutively changed in accordance with the rotary angle of the diaphragm-adjusting knob 233, NA can also be consecutively changed as described above. Thus, the resolution R, the focal depth D and brightness of the image can be consecutively changed.

With the above operations, an operator can observe the sample at the operator's desiring magnification of the objective lens 200 with the operator's desiring resolution R, focal depth D and brightness of the image.

Effects and Advantages of Microscope

As described above, in the microscope 100 according to the above embodiment, the objective lenses 200 each include: the tubular body 210 fixable to the revolving nosepiece 130; the lenses 222 provided within the tubular body 210 for receiving the light from the object A; and the iris diaphragm 230 provided in the vicinity of the fixed portion 211 of the tubular body 210 for suitably changing the aperture diameter of the light-transmissive aperture 235.

Accordingly, by adjusting the diaphragm-adjusting knob 233 of the iris diaphragm 230 so as to suitably change the aperture diameter of the light-transmissive aperture 235, the value of NA can be easily changed, thereby setting the resolution R, the focal depth D and the brightness of the image respectively at operator's desiring values. Thus, since there is no need to replace the objective lens 200 unlike conventional arrangement, adjustment of the objective lens 200 is facilitated, thereby enhancing operation efficiency.

In addition, since the value of NA can be easily changed by merely attaching the above objective lens 200 on the revolving nosepiece 130, there is no need to separately provide the trunk 110 with a diaphragm for narrowing down the light from the objective lens 200, thereby facilitating the arrangement of the microscope 100.

The iris diaphragm 230 is provided at the exit-pupil surface 230A where the exit pupil of the lenses 222 is formed.

The objective lens(es) 200 of the microscope 100 according to the present embodiment uses the iris diaphragm 230 as a diaphragm.

Accordingly, by operating the diaphragm-adjusting knob 233, the aperture diameter of the light-transmissive aperture 235 can be consecutively changed. Thus, since the value of NA can be consecutively changed so as to be finely adjusted, the resolution R and the focal depth D can be set respectively at values more suitable for profile, size or the like of the object A.

In addition, the trunk 110 of the microscope 100 is provided with the illumination guide 140 (vertical reflected illumination system), such that the amount of the illumination light is adjusted by the aperture diaphragm 141A. Accordingly, by using both the illumination guide 140 and the iris diaphragm 230 together, the microscope 100 can be adjusted more suitable for a profile, a size or the like of the object A, thereby enabling an observation suitable as usage.

Modification(s) of Embodiment

The present invention is not limited to the embodiment described above, but includes other arrangements such as the following modification(s) as long as an object of the present invention can be achieved.

Although the diaphragm-adjusting knob 233 of the iris diaphragm 230 is manually rotated to adjust the aperture diameter of the light-transmissive aperture 235 in the above embodiment, the arrangement is not limited thereto. For instance, an interlocking portion interlocked with the movable frame 232 of the iris diaphragm 230 may be provided, to which a small stepping motor or solenoid may be connected.

For instance, in an arrangement where a stepping motor is used, the stepping motor is connected with, for instance, a control circuit for controlling the entire operations of the microscope 100, and a pulse voltage applied to the stepping motor is controlled by a diaphragm controller provided to the control circuit, such that a rotary angle of the stepping motor is controlled and the aperture diameter of the light-transmissive aperture 235 of the iris diaphragm 230 is adjusted. In the above arrangement, for instance, a controller connected to the control circuit may be operated so that the diaphragm controller may apply a pulse voltage in accordance with an operation signal therefrom on the stepping motor. Alternatively, a specific aperture diameter of the light-transmissive aperture 235 may be input through an input device such as a keyboard so that the diaphragm controller may apply a pulse voltage in accordance with the input value on the stepping motor. With such an arrangement, the present invention is applicable to various fields such as automatic observation, in-line measurement and the like of the microscope 100.

Although the aperture diameter of the light-transmissive aperture 235 is consecutively changed by the iris diaphragm 230 in the above embodiment, the arrangement is not limited thereto. For instance, the diaphragm may be arranged such that the aperture diameter of the light-transmissive aperture 235 is changed up to a predetermined diameter in a stepwise manner, and the aperture diameter of the light-transmissive aperture 235 may be set at the predetermined diameter as necessary by operating, for example, a lever. When optical performance is set at a predetermined value as in an image measurement, the diaphragm arranged as above can immediately set the aperture diameter of the light-transmissive aperture 235 at a more suitable value, thereby enhancing operation efficiency at the time of measurement.

Alternatively, the diaphragm-adjusting knob 233 of the iris diaphragm 230 may be provided with an engaging pin that is engaged with a locking portion provided on the frame when the aperture diameter of the light-transmissive aperture 235 becomes a predetermined value. According to such an arrangement, by finely adjusting the diaphragm-adjusting knob 233, the aperture diameter of the light-transmissive aperture 235 can be consecutively changed. In addition, when, for instance, an image measurement (i.e., a measurement where optical performance is set at a predetermined value) is conducted, by rotating the diaphragm-adjusting knob 233 to engage the engaging pin with the locking portion, the aperture diameter of the light-transmissive aperture 235 can be immediately set at the predetermined diameter, thereby further enhancing operation efficiency.

A diaphragm unit in which a diaphragm is provided may be detachably provided to the objective lens(es) 200. With this arrangement, replacement and maintenance of the diaphragm unit can be facilitated. In addition, by merely providing the diaphragm unit to, for instance, a conventional objective lens to which no diaphragm is provided, the value of NA of the objective lens can be easily adjusted, thereby dispensing with a process of preparing a dedicated objective lens.

Although the exit pupil of the lenses 222 is located outside of a lens 222 disposed the closest to the fixed portion 211 of the objective lens 200 and the iris diaphragm 230 is provided at the position where the exit pupil is located in the above embodiment, the iris diaphragm 230 may be provided in the rear vicinity of the lens 222 disposed the most closest to the exit pupil when the exit pupil is located, for instance, within the lens 222 disposed the most closest to the fixed portion 211 of the objective lens 200. Although, in the above arrangement, a slight deviation is caused in the resolution R and the focal depth D as compared with the arrangement where the iris diaphragm 230 is provided at position where the exit pupil is formed, the same effects as in the above embodiment (e.g., an effect that the value of NA can be easily changed and an effect that the resolution R and the focal depth D can be easily changed) can be obtained.

When the exit pupil is formed between an adjacent pair of lenses 222 of the objective lens 200, the iris diaphragm 230 may be disposed between the adjacent pair of lenses 222.

Since the iris diaphragm 230 is provided in the objective lens 200, the entire length of the tubular body 210 of the objective lens 200 is increased. Accordingly, when, for instance, the objective lens(es) 200 of the present invention and conventional objective lens(es) in which no iris diaphragm 230 is provided are mounted on the revolving nosepiece 130 in a mixed manner, the objective lens(es) in which no iris diaphragm 230 is provided is preferably attached with, for instance, an adaptor, so that the length of the objective lens(es) becomes the same as the length of the objective lens(es) 200 of the present invention. With this arrangement, when, for instance, the revolving nosepiece 130 is rotated, the tip end(s) of the objective lens(es) 200 is prevented from contacting the object A on the stage.

Specific structure(s) or process(es) for implementing the present invention may be changed as necessary to other structures or the like as long as an object of the present invention is achieved.

The priority application Number JP 2007-131771 upon which this patent application is based is hereby incorporated by reference.

What is claimed is:

1. An objective lens that is fixed on a main body of an optical device, the objective lens guiding a light reflected by a measurement surface of an object toward the main body, the objective lens comprising:
    a tubular body;
    at least one lens provided in a manner facing the object, the at least one lens transmitting the light reflected from the measurement surface of the object;
    a lens holder provided within the tubular body, the lens holder holding the lens;
    a diaphragm comprising a light-transmissive aperture provided at a position where an exit pupil of the lens is formed and an aperture-diameter changer that changes an aperture diameter of the light-transmissive aperture; and
    a fixed portion provided on an end of the tubular body opposite to the object, the fixed portion being detachable from the main body.

2. The objective lens according to claim 1, wherein the diaphragm consecutively changes the light-transmissive aperture.

3. The objective lens according to claim 2, wherein the diaphragm is an iris diaphragm.

4. The objective lens according to claim 1, wherein the diaphragm changes the light-transmissive aperture in a stepwise manner.

5. The objective lens according to claim 1, further comprising a diaphragm controller that controls the diaphragm to change the light-transmissive aperture.

6. An optical measuring device, comprising:

the objective lens according to claim 1; and the main body comprising: an image-forming unit that forms an image from the light transmitted through the objective lens; an eyepiece from which the light is irradiated; and an optical path that guides the light from the objective lens to the eyepiece.

* * * * *